United States Patent [19]

Lang

[11] 4,406,915
[45] Sep. 27, 1983

[54] OFFSET REFORMABLE JUMPER

[75] Inventor: Gary E. Lang, Garden Grove, Calif.

[73] Assignee: Allied Corporation, Morristown, N.J.

[21] Appl. No.: 252,963

[22] Filed: Apr. 10, 1981

[51] Int. Cl.$^3$ .............................................. H01B 7/04
[52] U.S. Cl. .............................. 174/117 F; 174/72 A; 174/72 TR; 174/117 FF
[58] Field of Search ............ 174/72 A, 72 TR, 117 F, 174/117 FF

[56] References Cited

U.S. PATENT DOCUMENTS

| | | | |
|---|---|---|---|
| 2,628,998 | 2/1953 | Frisbie | 174/117 F |
| 3,296,365 | 1/1967 | Basile | 174/117 FF |
| 3,794,522 | 2/1974 | Mueller | 174/117 F X |
| 3,833,755 | 9/1974 | Soelberg | 174/117 F |
| 3,836,415 | 9/1974 | Hilderbrandt | 174/72 A X |
| 4,130,934 | 12/1978 | Asick et al. | 174/117 F X |

FOREIGN PATENT DOCUMENTS

| | | | |
|---|---|---|---|
| 2283528 | 3/1976 | France | 174/72 A |
| 2029629 | 3/1980 | United Kingdom | 174/117 F |

OTHER PUBLICATIONS

Institute of Printed Circuits, Flat Cable Design Guide, IPC-FC-225 publication cover page, Aug. 1975, Evanston, Ill.

Primary Examiner—R. R. Kucia
Attorney, Agent, or Firm—James P. DeClercq

[57] ABSTRACT

A jumper cable is formed from conventional ribbon cable having parallel conductors embedded in insulating material, either by laminating insulated or uninsulated conductors between plastic films, by extruding a plastic film around insulated or uninsulated conductors, or by bonding insulated conductors together, and subsequently separating the resulting individual insulated conductors at spaced intervals, forming a jumper of increased flexibility and reformability for use in confined spaces, without the need for subsequent removal of any part of the ribbon cable. The ribbon cable is preferably formed in sections, each section containing an oblique section of separated conductors, and separated by an oblique stripped area of uninsulated conductors, adjacent insulated cable sections being offset from each other. The resulting cable is then preferably folded at a stripped area, to form a V-shaped offset reformable jumper which may be easily reformed and reoriented after installation to fit into a confined space, while also having sections of unmodified ribbon cable serving as support section maintaining the individual conductors at predetermined parallel spacing to facilitate interconnection and to prevent the individual conductors from becoming tangled. The jumper may be used to connect two devices that are side by side, or arranged in a V-shaped or W-shaped arrangement, as well as for connecting devices which are aligned.

4 Claims, 11 Drawing Figures

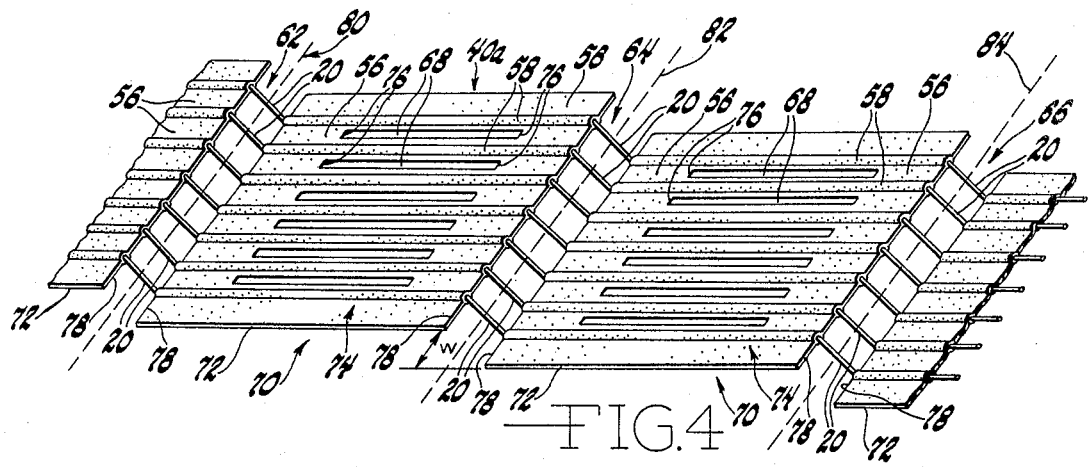
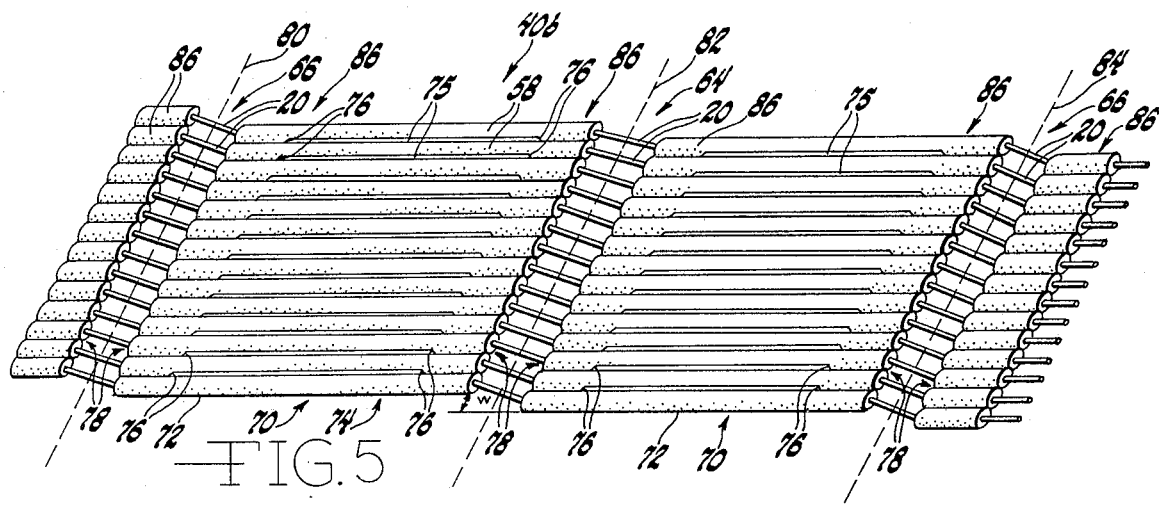
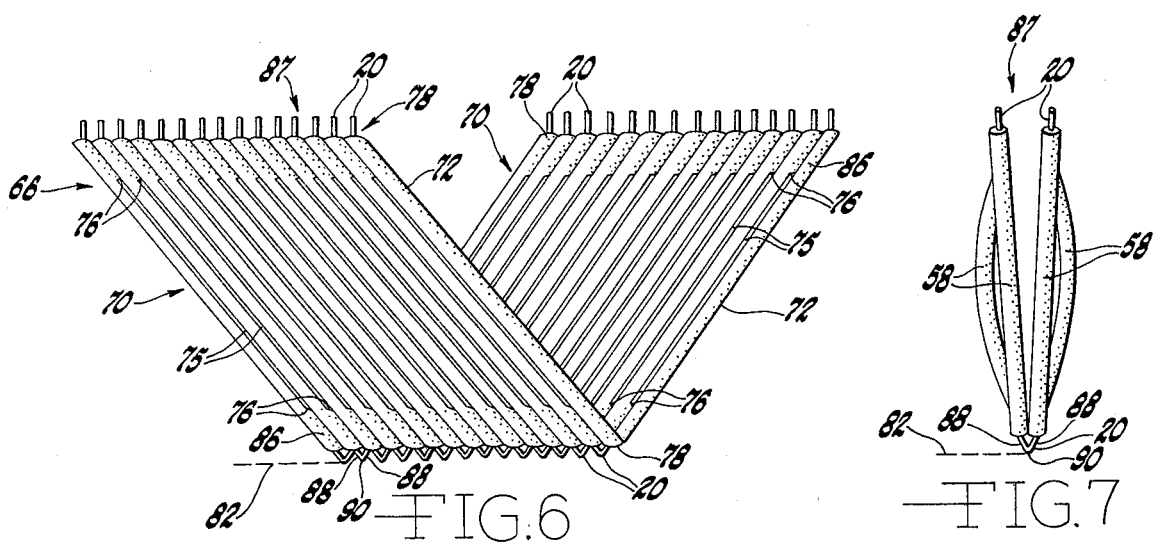

OFFSET REFORMABLE JUMPER

This invention relates to jumper cables formed from ribbon cable. In particular, this application relates to a reformable jumper cable, preferably an offset reformable jumper cable.

U.S. Pat. No. 4,113,335, entitled "RE-FORMABLE MULTICONDUCTOR FLAT CABLE" disclosed one prior attempt to provide a multiple conductor cable for use in a very confined space, which may be reformed or rearranged into the confined space without negating the advantages such as mass termination of a ribbon cable. For instance, a telephone junction box has a very limited amount of space, within which a plurality of electrical connectors must be placed very close to each other, and electrically interconnected. Of course, individual conductors may be used to interconnect connectors for the various devices in a telephone junction box, and easily reformed, but cannot be mass terminated, and are prone to become tangled. Conventional laminated cable, while suitably for highly desirable mass termination, has a flat configuration which cannot be readily reformed to accommodate the very limited confines of a telephone junction box or the like. U.S. Pat. No. 4,113,335, assigned to the assignee of this application and hereby incorporated by reference, discloses a jumper cable fabricated by bonding individual insulated wires to an insulating plastic film, at intervals. The plastic film is peelably bonded only, forming a weak bond to the individual insulated conductors, and sections of the plastic film of the cable are not bonded at all to the conductor, and function as tear tabs. The peelably bonded areas serve as support, allowing the jumper to be mass terminated to a connector or the like, and then, the laminating film is removed by pulling on the unlaminated portion to break the weak bond of the peelably bonded portion, leaving a plurality of individually insulated wires. As will be apparent, the peelable bond may also be broken during mass termination if undue stresses are applied to the individual insulated conductors. As will be further apparent, the resulting jumper is not a cable which can be neatly arranged in a confined space, but rather a plurality of insulated separate conductors which may become randomly oriented and tangled. Further the force necessarily applied to the peelably bonded insulating film to break the peelable bond to the individual insulated conductors may cause damage to the connections between the insulated conductors and connectors or the like, or to devices attached to the connectors, as well as involving removable pieces which may be accidently left in the confined enclosure and cause various difficulties and inconveniences.

Conventional ribbon cable has been achieved in the prior art by laminating accurately spaced insulated or uninsulated multiple conductors between thin plastic films, such as 5 mil polyvinyl chloride (PVC) film or 5 mil flurocarbon resin film such as is available under the trademark Teflon, or by bonding individual insulated conductors together, such as is disclosed in U.S. Pat. Nos. 3,005,739 and 3,208,896, hereby incorporated by reference, to form a flat ribbon.

It should be specifically noted that ribbon cables have been produced by tangentially bonding adjacent insulated conductors, either by the use of a solvent, as in U.S. Pat. No. 3,005,739, or by the use of heat. A ribbon cable having alternating bonded and separated conductor segments may be produced in either manner. Such a cable may be made, for instance, by modifying the apparatus shown in U.S. Pat. No. 3,005,739 to vertically oscillate the device which holds the parallel insulated conductors in the solvent tank, or by, for example, replacing the solvent tank with an intermittently-operated heater assembly, such as an assembly having a cold platen and a hot-air nozzle, the conductors being lifted from the cold platen and heated to make bonded sections, or a heated platen may be intermittently brought into contact with laterally constrained parallel conductors. Also, as disclosed in U.S. Pat. No. 4,034,148, a ribbon cable including twisted pair conductors and also precisely laterally aligned straight conductors may be provided, as may a ribbon cable including only twisted pair conductors or only precisely laterally spaced straight conductors of even or uneven spacing.

Laminated, multiconductor cable of the types described are readily strippable, for mass termination purposes, or may be readily connected directly to insulation-displacing connectors readily available in the art.

SUMMARY OF THE INVENTION

This invention is directed to multiconductor flat cable, which may readily assume a re-formed shape, such as an irregular, separated, bunched, or re-grouped configuration, after mass termination of the ends thereof, in order to conform to very limited space considerations, without affecting in any way the ability to mass terminate the cable to insulation displacing connectors or, to other types of mass termination connectors, or to conveniently connect the cable to other types of connectors with terminals on matching spacings, or directly to other devices, such as printed circuit boards.

More specifically, the invention is directed towards a multiconductor flat ribbon cable, including a plurality of laterally spaced, longitudinally extending wire conductors, laterally aligned in a predetermined, precisely spaced pattern, laminated to or embedded in a flexible plastic laminating film, or including separate insulated conductors bonded together. The laterally aligned and spaced conductors are intermittently separated, and intermittently stripped of the insulating film and insulation, if any, and either cut or folded at the stripped area. Separating the conductors leaves a remaining web portion, which provides for wire support before and after termination, and any subsequent reforming operation, thereby reducing conductor breakage or short circuits, and forming a permanent strain relief throughout the life of the assembly, not just a temporary positioning aid. A plurality of segments including portions of separated conductors may be used to form a long but flexible and reformable jumper cable, or a single section may be used to form a short jumper cable, and, by folding the cable at a stripped portion, a jumper connecting three connectors or the like may be provided. Stripping the cable at a lateral oblique angle, with a corresponding adjustment in the shape of the area of separated insulated conductors, provides an offset reformable jumper cable, in a configuration which is particularly desirable for making connections between connectors or the like disposed side by side.

A cable of the type described has substantial advantages over prior art cables. The dimensional stability of an offset reformable jumper in accordance with the invention is increased, due to the fact that the jumper is in an "as manufactured" condition, as opposed to being reformed before assembly, which may distort the cable to make mass termination difficult. The cost of installation of such a jumper is significantly reduced, due to the fact that peelably bonded segments of plastic film or paper tape or the like do not have to be removed after termination, as in previous jumpers. As stated above, the remaining unmodified portion of the ribbon cable provides wire support before and after termination, and helps to prevent tangling during reformation.

Therefore, it is an object of the invention to provide a jumper cable including a plurality of parallel conductors which may be conveniently mass terminated and conveniently reformed to fit in confined spaces. It is an advantage of the invention that such a jumper cable may be formed from conventional ribbon cable in a simple and convenient manner. It is a further advantage of the invention that no parts of the cable need be removed after the cable is terminated. It is a feature of the invention that a conventional ribbon cable is modified by forming spaced sections of separated insulated conductors, unmodified ribbon cable, and stripped bare conductors, the separated portions being flexible and reformable, the unmodified portions providing dimensional stability and cable support, and the stripped sections allowing termination by soldering or the like, while the unmodified cable area may be alternatively used for conventional termination by means of insulation displacing connectors. It is a further feature of the invention that an offset reformable connector may be produced by offsetting adjacent sections of ribbon cable and folding the ribbon cable at a stripped portion, forming a v-shaped offset reformable jumper for connecting three connectors or the like.

BRIEF DESCRIPTION OF THE DRAWINGS

FIG. 4 is a perspective view of a length of ribbon cable such as may be produced with forming rollers as shown in FIG. 3, prepared for forming into an offset reformable jumper according to the invention.

FIG. 5 is a perspective view of a section of ribbon cable such as may be produced with forming rollers as shown in FIG. 3, prepared for forming into an offset reformable jumper according to the invention.

FIG. 6 is a front elevational view of an offset reformable jumper formed from the cable shown in FIG. 5.

FIG. 7 is an end elevational view of the offset reformable jumper shown in FIG. 6.

DESCRIPTION OF THE PREFERRED EMBODIMENTS

As will become apparent, offset jumpers and reformable jumpers according to the invention may be produced from various types of ribbon cable, although only two types, produced by two different methods are shown in detail herein. Examples of other suitable types of ribbon cable may be found, for example, in U.S. Pat. Nos. 3,005,739; 3,208,896; 4,012,577 and 4,034,148, hereby incorporated by reference. The appropriate method for forming these ribbon cables into the reformable jumper of the invention will become apparent when comparing the cross-sectional profiles of these ribbon cables with the ribbon cables illustrated and described below.

Figure 1:
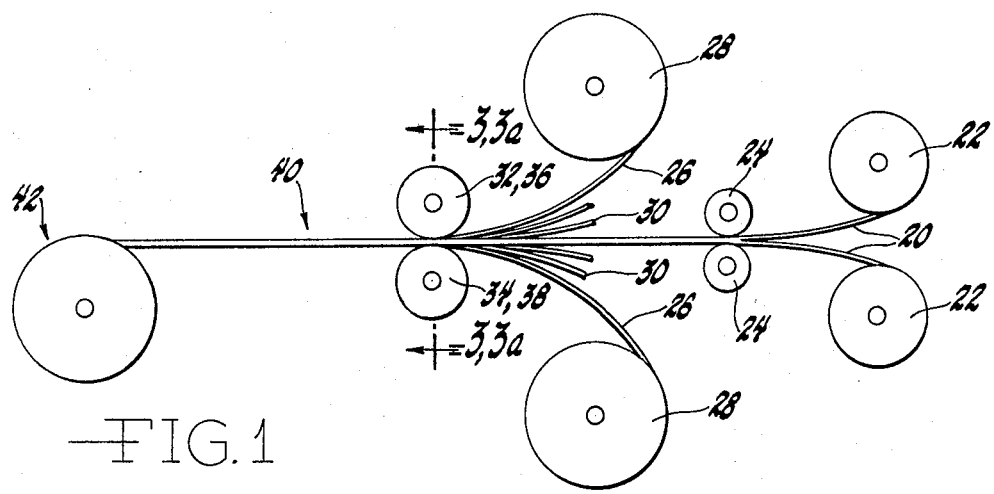
FIG. 1 is a schematic side elevational view illustrating a first apparatus suitable for making a ribbon cable usable with the invention.

FIG. 1 shows an apparatus for implementing one method of forming a ribbon cable. Wire 20 is supplied from wire supply spools 22, two of which are illustrated for clarity, although conventional ribbon cable contains between ten and sixty-four conductors such as wires 20. Wires 20 are drawn through feed rollers 24, which may be appropriately grooved to hold conductors shown as wires 20 in a predetermined precise even or uneven lateral spacing relationship. Plastic laminating films 26 are supplied from films supply spools 28, and heated by hot air from hot air supply nozzles 30. As will be apparent, plastic laminating films 26 are preferably thermoplastic materials, such as polyvinyl chloride polymers, flurocarbon resin, polyester, polyamides or polyolefinic materials, although many other types of polymer plastics and resins may be employed. Conductors shown as wires 20 are embedded in plastic laminating films 26, the laminating films being formed into a single longitudinally extending insulating body by laminating rollers 32 and 34, or 36 and 38, to form a cable generally indicated as 40, which may be collected on spool 42, if desired, or may be formed immediately into reformable jumpers according to the invention rather than be collected on spool 42.

Figure 2:
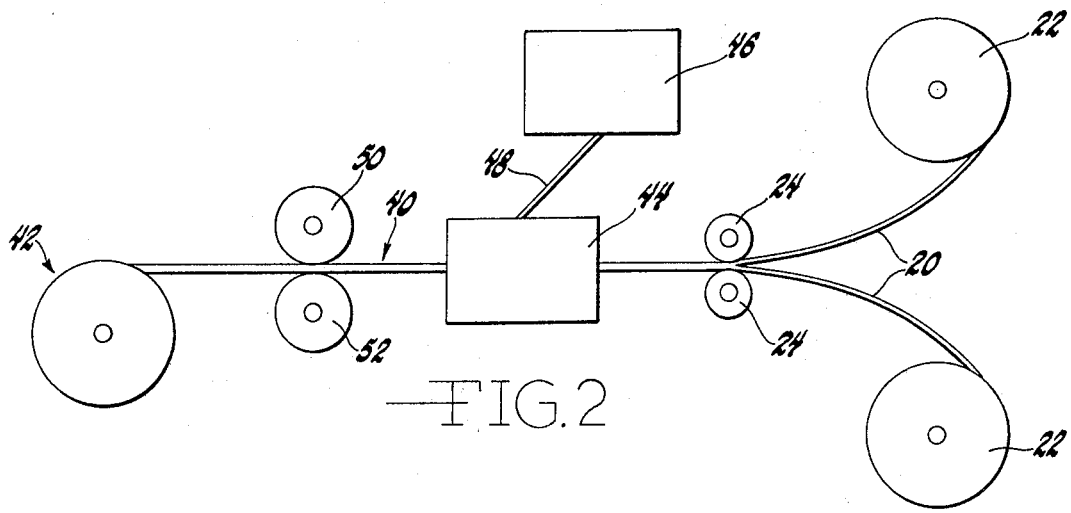
FIG. 2 is a schematic side elevational view of a second apparatus for making a ribbon cable suitable for use with the invention.

FIG. 2 is a schematic illustration of an alternate method of making a cable 40, by extruding. As in FIG. 1, conductor shown as wires 20 are supplied from wire supply spools 22 and drawn through feed rollers 24. However, hot plastic laminating material is applied to the conductors shown as wires 30 by extruder head 44, drawing a suitable plastic material from reservoir 46 through a conventional feeder 48. It is believed that the design of a suitable extruder head 44 is well within the skill of one skilled in the art of extruding insulation around conductors to form conventional plastic-insulated wire. Cable 40 is then drawn through extruder head 44 by rollers 50 and 52, which, if desired, may have a surface contour appropriate to match the contours of the newly-extruded cable 40. Cable 40 may be collected on spool 44 for subsequent processing, or may be directly formed into reformable jumpers according to the invention.

Figures 3, 3A:
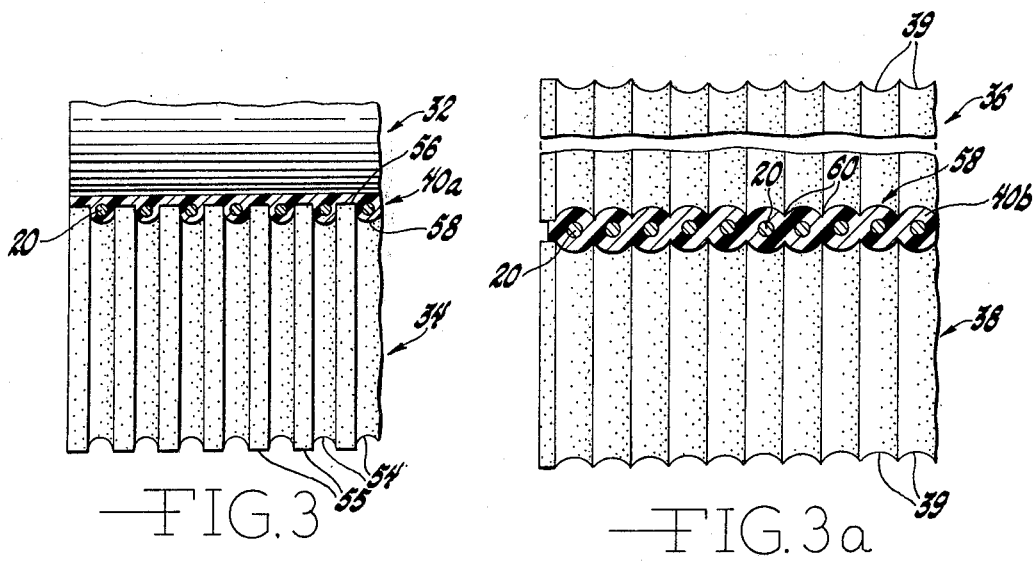
FIG. 3 is an illustration of a first set of forming rollers usable with the apparatus shown in FIG. 1.
FIG. 3a is an illustration of a second set of forming rollers usable with the apparatus illustrated in FIG. 1.

FIGS. 3 and 3a illustrate typical laminating rollers for two types of laminated ribbon cable, as well as illustrating the profiles of ribbon cables that may also be made by other methods, such as extruding or bonding of insulated conductors. As shown in FIG. 3, roller 32 is a smooth-surfaced roller, and roller 34 has a plurality of spaced circumferential grooves 54 separated by circumferential flat portions 55, for producing a ribbon cable 40a which has web portions 56 separating insulated conductors 58 of ribbon cable 40a. As will be apparent from inspection of FIG. 3, preinsulated conductors could be bonded to a single plastic film to form ribbon cable 40a, though the illustrated embodiment is made by embedding bare conductors in a longitudinally extending insulating body either by laminating them between plastic films or by extruding plastic material around them. Ribbon cable 40a is suitable for use where terminals to be joined by ribbon cable 40a are comparatively widely spaced.

FIG. 3a illustrates laminating rollers 36 and 38, for forming a ribbon cable 40b. Ribbon cable 40b is best adapted for use where terminals to be interconnected by ribbon cable 40b are closely spaced, and also adapted to be manually separated for connection to more widely spaced terminals due to the lower tearing or shearing strength of thin section 60 in the insulation of cable 40b surrounding each of the laterally spaced conductors shown as wires 20. Although rollers 36 and 38 are both shown as having circumferential abutting grooves 39, thin sections 60 may be advantageously formed with roller 36 being a grooved roller, as shown, and a roller 38 being flat, preferably of rubber or the like, avoiding the machining of a roller 38 while producing a cable substantially identical to that shown as cable 40b. As will be apparent from FIG. 3a, cable 40b may also be produced by extrusion, or by applying either heat or solvents to insulation of preinsulated wires, to bond them together in a ribbon cable, although this is less desirable since variation in the insulation thickness of preinsulated wires detracts from the precision of lateral spacing which is desirable for mass termination techniques.

FIGS. 4 and 5 illustrate cables in the configurations of cables 40a and 40b, respectively, after several further steps in accordance with the invention have been performed.

As shown in FIG. 4, insulation has been stripped from cable 40a at intervals, leaving portions of parallel, laterally spaced, longitudinally extending bare conductors shown as wires 20 at stripped portions 62, 64 and 66. Notches 68 have been made in web portion 46 in laterally spaced areas 70 by a conventional notching technique commonly used to separate ribbon cable conductors for termination or connection. As illustrated, the insulating body formed around conductors shown as wires 20 is laterally removed at an oblique angle, preferably 45 degrees, in accordance with the preferred embodiment of the invention, although, as will be apparent, non-offset reformable jumpers according to the invention may be fabricated by removing insulation in stripped portions such as 62, 64 and 66 perpendicular to an edge 72 of cable 40a. Also as illustrated, notches 68 have been formed in web portion 56 in an oblique manner, forming oblique areas 74 of separated parallel insulated conductors 58, although, as will be apparent, jumpers in accordance with the invention may be fabricated by forming notches 66 having ends 76 oriented in a line perpendicular to an edge 72 of cable 40a.

As will be apparent from inspection of FIG. 4, a jumper cable of any length, having the desired reformability and flexibility for use in confined spaces may be fabricated by simply leaving the insulating body of cable 40a untouched between laterally spaced cable sections 70, leaving a cable with a plurality of symmetrically spaced areas of separated insulated conductors, and areas of unmodified cable 40a. Also, as shown in FIG. 4, laterally spaced cable sections 70 have been offset on either side of stripped portion 62, 64 and 66, by a distance W, placing conductors shown as wires 20 at an orientation which is perpendicular to ends 78 of cable section 70. As will be apparent, cable 40a may be cut along lines 80 and 84, passing through stripped portions 62 and 66, and folded at line 82, passing through stripped portion 64, to form an offset reformable jumper according to the invention.

FIG. 5 illustrates a cable which is quite similar to the cable shown in FIG. 4, except produced from a second type of ribbon cable, shown in profile in FIG. 3a. In the embodiment shown in FIG. 5, separation of insulated conductors is done by deflecting alternate conductors out of the plane of the cable, in a direction perpendicular to the cable, shearing the insulating body of the ribbon cable between the individual insulated conductors. It should be specifically noted that insulated conductors of various types of ribbon cable may be separated in various manners in accordance with the invention. For instance, notching, a conventional technique, may be applied to any ribbon cable with space between the individual insulated conductors, or slitting, using one or a plurality of knife blades, and other known techniques for puncturing or cutting a material may be used to produce a reformable jumper in accordance with the invention. Therefore, identical reference numerals will be used for identical features whenever possible.

In FIG. 5, as in FIG. 4, the insulating body of ribbon cable 40b is removed at laterally spaced intervals, such as by use of a Carpenter stripper as shown in U.S. Pat. No. 3,385,140, to form stripped portions 62, 64 and 66, exposing bare conductors shown as wires 20, separating cable 40b into a plurality of longitudinally spaced cable sections 70. As in the case of the embodiment shown in FIG. 5, stripped areas 62, 64 and 66 may be formed either perpendicular to an edge 72 of cable 40b, or at an oblique angle, preferably 45 degrees. A suitable jig apparatus for use with a Carpenter stripper in forming stripped areas 62, 64, 66 is shown in U.S. Pat. No. 3,851,425. The insulation of cable 40b is broken between individual insulated conductors 58 to form a plurality of longitudinally spaced laterally extending areas of separated insulated conductors 58, joined together at spaced intervals by unmodified portions 86, here shown as oblique areas 74. The slits 75 formed by separating individual insulated conductors 58 have ends 76 oriented obliquely to edge 72 of cable 40b to form oblique area 74, although a straight reformable jumper according to the invention would be made by orienting ends 76 perpendicularly to edge 72 of cable 40b.

To form an offset reformable jumper according to the invention, adjacent cable sections 70 are offset a distance W on either side of a stripped area such as 62, 64 or 66, to place bare conductors shown as wire 20 perpendicular to ends 78 of cable sections 70. Cable 40b would then be cut along lines 80 and 84 in stripped areas 62 and 64, and folded at line 82, passing through intermediate stripped area 64. As with the embodiment shown in FIG. 4, a straight reformable jumper may be formed in any desired length by providing a ribbon cable with symmetrically disposed laterally spaced areas of separated insulated conductors, unmodified cable portions, and stripped, bared conductors at opposite ends of the cable. In this case, stripped areas 62, 64 and 66 are separated areas 74 would preferably be oriented perpendicular to edge 72 of cable 40b.

FIGS. 6 and 7 show front elevational and side elevational views of an offset reformable jumper according to the invention, formed from ribbon cable 40b as shown in FIG. 5. Obviously, the equivalent result would be obtained from ribbon cable 40a shown in FIG. 4. The two adjacent cable sections 70 are folded about line 82, forming a generally V-shaped assembly, with one cable section 70 partially overlying the second cable section 70. Conductors shown as wires 20 of stripped area 64 are bent about line 82 to form a generally U-shaped bend having sides 88 substantially parallel to each other and a bight 90. The side view shown in FIG. 7 clearly shows the residual bowing due to separating individual insulated conductors 58 by shearing the insulating body of cable 40b by deflecting alternate insulated conductors perpendicular to the plane of the cable, although such residual bowing would not be apparent in an offset reformable jumper formed from ribbon cable 40a, as shown in FIG. 4, or in offset reformable jumpers according to the invention made in any other manner which forms an offset reformable jumper from a ribbon cable, having joined sections at either end of separated conductor sections, and terminal stripped sections.

Figure 8:
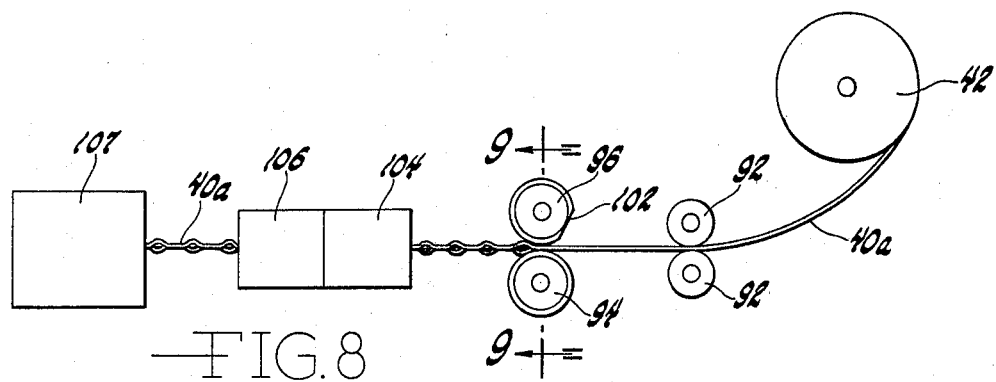
FIG. 8 is a schematic illustration of apparatus for producing an offset reformable jumper according to the invention.
Figure 9:
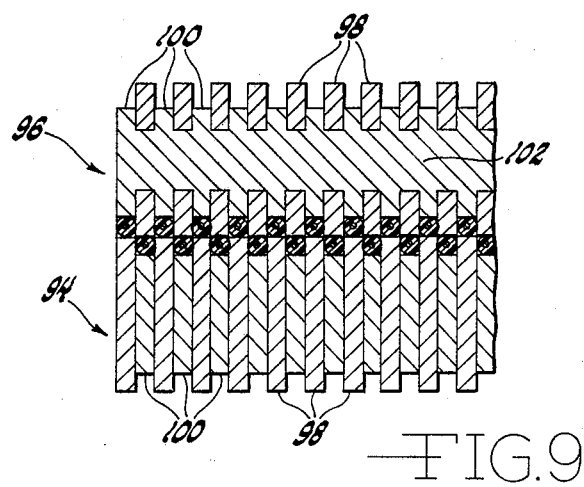
FIG. 9 is a front elevational view showing separating rollers for separating the conductors of a reformable jumper according to the invention.

FIG. 8 shows, in schematic form, a process for producing offset reformable jumpers in accordance with the invention. Cable 40a is drawn from spool 42 by rollers 92, and fed into separating means here shown as separating rollers 94 and 96. Rollers 94 and 96 are composed of a plurality of symmetrically reversed discs 98, each disc having a reduced diameter portion 100 defining a circumferential groove when discs 98 are assembled. Separating rollers 96 have a machined flat 102, such as for leaving portions 86 of a ribbon cable unseparated. Although the precise order of steps in forming the invention is not part of the invention, as illustrated, ribbon cable 40a is then acted upon by a stripping apparatus 104. As stated above, one suitable stripping apparatus is shown in U.S. Pat. Nos. 3,385,140 and 3,851,425. The ribbon cable 40a is then acted upon by an offsetting apparatus 106, for offsetting adjacent cable sections 70 by a distance W. Such an offsetting apparatus can be built with jaws which seize adjacent sections 70 of cable 40a, one jaw remaining fixed in position, the other sliding laterally a distance W before both jaws release and the cable is indexed forward by one cable section 70. This process is repeated for each adjacent section 70. Cable 40a may then act upon by cutting and bending apparatus 107, for separating cable 40a, as previously acted upon by the separating device shown as rollers 94 and 94, stripping apparatus 104, and offsetting apparatus 106, forming cable 40a into individual offset reformable jumpers 87. Cutting and bending apparatus 107 may be manually operated, or may be automatically performed, such as by apparatus having flat jaws which sieze adjacent sections 70 of cable 40a, one jaw pivoting and sliding to rest partially on top of the second, and a synchronized cutting blade for freeing an offset jumper 87 from the remainder of cable 40a.

Figure 10:
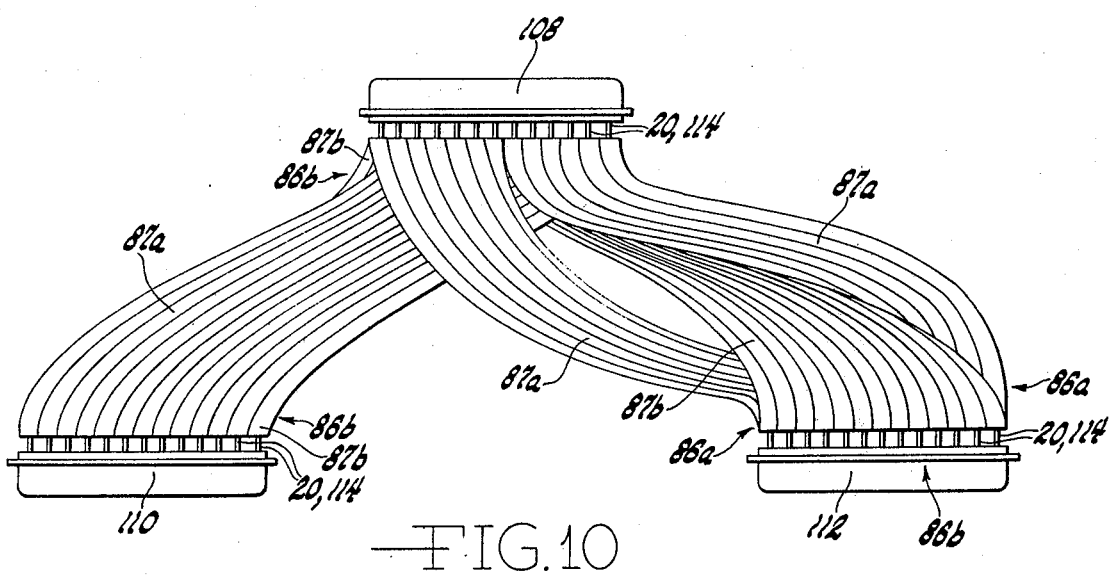
FIG. 10 is a perspective view of two offset reformable jumpers according to the invention interconnecting three offset conventional connectors.

FIG. 10 illustrates a reformable jumper assembly according to the invention, for connecting three conventional connectors 108, 110 and 112, oriented in a generally V-shaped configuration, as illustrated. As illustrated, two reformable jumper cables, identified as 87a and 87b, are used to interconnect two parallel rows of terminals on connectors 108, 110 and 112, respectively, in a manner which cannot be conveniently accomplished by the prior art. Ribbon cable conductors shown as wires 20 are joined to terminals 114, divided into two rows on each connector, by conventional techniques such as soldering, areas 86a and 86b of offset reformable jumpers 87a and 87b serving to maintain individual conductors together, to facilitate the operation of connecting wires 20 to terminals 114. As shown in FIG. 10, offset reformable jumper 87a is connected to the row of terminals 114 on connector 110 shown as the front row, to the row of terminals 114 on connector 108 shown as the front row, and to terminals 114 on connector 112 shown as the rear row, while offset reformable jumper 87b is connected to the rear row of terminals 114 on connector 110, the rear row of terminals 114 of connector 108, and the front row of terminals 114 of connector 112. This arrangement, as will be apparent, necessitates that one jumper cable must pass through the other jumper cable, a configuration not conveniently possible with prior art. As will be apparent, the portion of offset jumper 67b connected to connector 112 must be reformed and passed through offset reformable jumper 87a before connection to terminals 114. In all known prior art, removing an element of ribbon cable to allow it to be reformed separated it into individual conductors, not suitable for convenient mass termination, and inconveniently to manually randomly terminate, particularly when the individual insulated conductors of the ribbon cable are identical in color, such as with a laminated assembly incorporating uninsulated conductors, or an extruded ribbon cable. FIG. 10 thus illustrates that unmodified portions 86 provide wire support, before and after termination, and for any subsequent reforming operation, thereby reducing conductor breakage and short circuits between terminals, and forming a permanent strain relief throughout the life of the assembly, and not just a temporary positioning aid for alignment of conductors shown as wires 20 of individual insulated conductors.

As will be apparent to one skilled in the art, numerous variations and modifications of the disclosed embodiments of the invention may be made, without departing from the spirit or scope of the invention.

I claim:
1. A reformable multiconductor cable, comprising:
a multiconductor ribbon cable having a plurality of longitudinally extending parallel conductors laterally spaced apart in a predetermined arrangement;
said multiconductor ribbon cable including a pliable longitudinally extending insulating body, said plurality of longitudinally extending parallel conductors being embedded in said insulating body;
said insulating body being intermittently laterally removed to form a plurality of longitudinally spaced sections of uninsulated parallel longitudinally extending conductors;
said insulating body being intermittently longitudinally interrupted intermediate said plurality of longitudinally extending laterally spaced conductors to form a plurality of longitudinally spaced sections of separated insulated parallel longitudinally extending conductors;
said sections of uninsulated parallel longitudinally extending conductors and said sections of separated insulated parallel longitudinally extending conductors being symmetrically longitudinally spaced along said multiconductor ribbon cable;
said cable having a length of at least two said sections of separate insulated parallel conductors and at least one said intermediate section of uninsulated parallel conductors;

said cable being terminated at opposite ends adjacent to and spaced from one said section of separated insulated conductors and being stripped of said insulating body to expose the bare wire of said conductors at said opposite ends;

said insulating body being obliquely laterally removed to form at least one oblique section of uninsulated conductors;

said body being intermittently broken to form a plurality of longitudinally spaced oblique sections of separated insulated parallel conductors;

said cable having at least two first cable sections, each said first cable section including one said spaced section of separated insulated conductors and being bounded by said spaced sections of uninsulated conductors;

each said first cable section being offset from an adjacent said first cable section so that said uninsulated conductors are disposed substantially perpendicularly to an end of each said first cable section;

said adjacent first cable sections being folded at a first one of said sections of uninsulated conductors, said uninsulated conductors defining a bight and two sides;

said cable being cut at two said sections of uninsulated conductors distal to said first section of uninsulated conductors.

2. A reformable multiple conductor cable according to claim 1, wherein:

said pliable insulating body is a plastic body;

said plastic body being selected from the group consisting of polyvinyl chloride, polyamides, polyester and polyolefinic polymeric plastics.

3. A reformable multiconductor cable according to claim 1, wherein:

said insulating body is intermittently interrupted intermediate said spaced conductors by notching, said cable defining a plurality of notched gaps between said separated insulated parallel conductors.

4. A reformable multiconductor cable according to claim 1, wherein:

said insulating film is intermittently interrupted intermediate said spaced conductors by deflecting alternate said spaced conductors perpendicular to said cable, said cable defining a plurality of sheared slits between said separated insulated parallel conductors.

* * * * *